(12) United States Patent
Parduhn et al.

(10) Patent No.: US 8,173,904 B1
(45) Date of Patent: May 8, 2012

(54) POST INSULATOR BLADE ADAPTOR

(75) Inventors: A. Philip Parduhn, Edmond, OK (US);
Raymond M. Woods, Edmond, OK (US)

(73) Assignee: Pelco Products, Inc., Edmond, OK (US)

( * ) Notice: Subject to any disclaimer, the term of this patent is extended or adjusted under 35 U.S.C. 154(b) by 222 days.

(21) Appl. No.: 12/762,321

(22) Filed: Apr. 17, 2010

Related U.S. Application Data

(60) Provisional application No. 61/171,172, filed on Apr. 21, 2009.

(51) Int. Cl.
*H01B 17/00* (2006.01)
(52) U.S. Cl. ............... 174/137 R; 174/138 R; 174/178; 361/626
(58) Field of Classification Search ............ 174/137 R, 174/138 R, 178; 361/626, 668
See application file for complete search history.

(56) References Cited

U.S. PATENT DOCUMENTS

| | | | |
|---|---|---|---|
| 4,866,218 A * | 9/1989 | Wilson, Jr. ................. | 174/158 F |
| 6,940,021 B2 * | 9/2005 | Pohl et al. ................. | 174/137 R |
| 7,728,230 B2 * | 6/2010 | Ma ............................ | 174/137 R |

* cited by examiner

*Primary Examiner* — Dhirubhai R Patel
(74) *Attorney, Agent, or Firm* — Mary M. Lee

(57) ABSTRACT

An adapter for use between a two-hole blade end fitting of a line post insulator arm and a Y-clevis bolt eliminates the need to replace the entire insulator arm when the end fitting fails or becomes distorted due to wear of the Y-clevis bolt. The adapter includes a body with a two-hole insulator end that connects to the end fitting and a single or double eye conductor end that supports the Y-clevis bolt. The conductor end is configured to align the load axis of the insulator arm with the Y-clevis bolt to transfer the tension load effectively through the adapter. Annular shoulders surround the two holes in the adapter back and the insulator end of the body. The shoulders extend into the bolt holes in the end fitting to center the bolts and form a clamp on the blade end to prevent further damage to the end fitting.

11 Claims, 6 Drawing Sheets

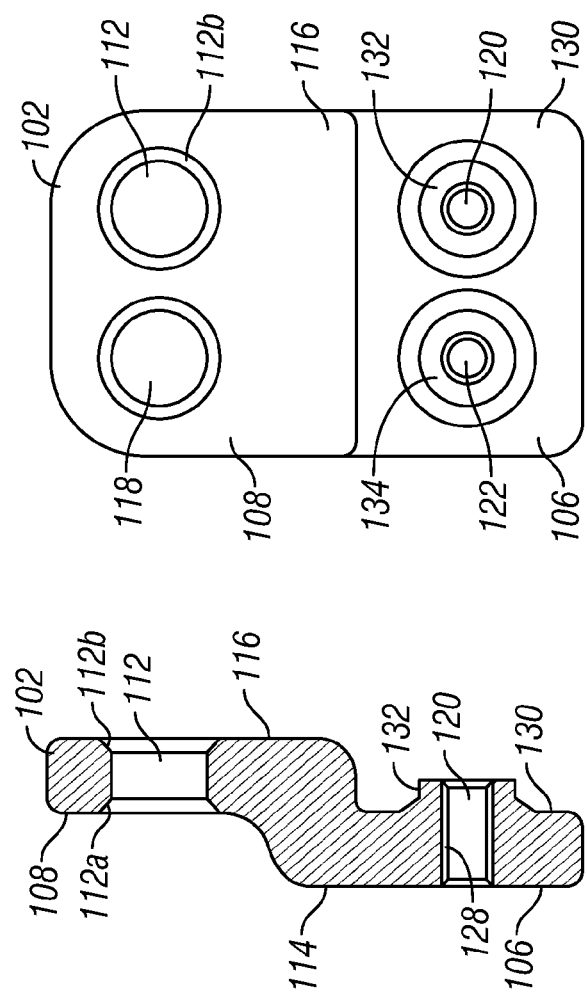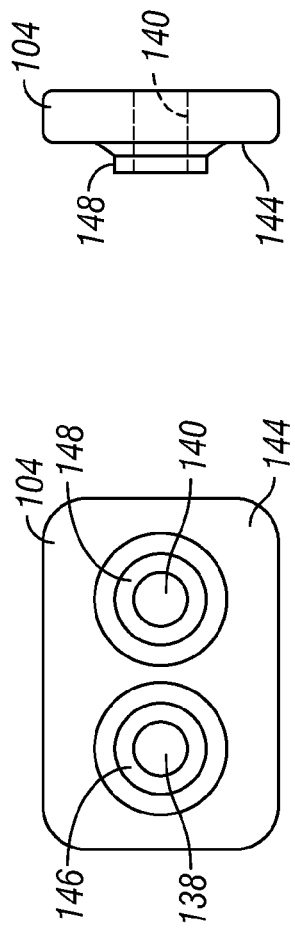

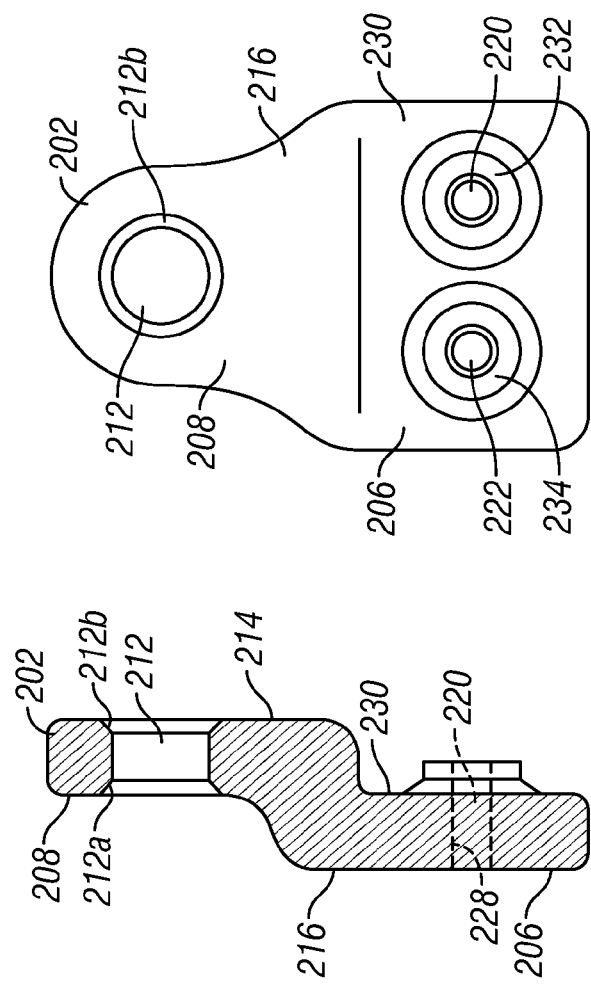
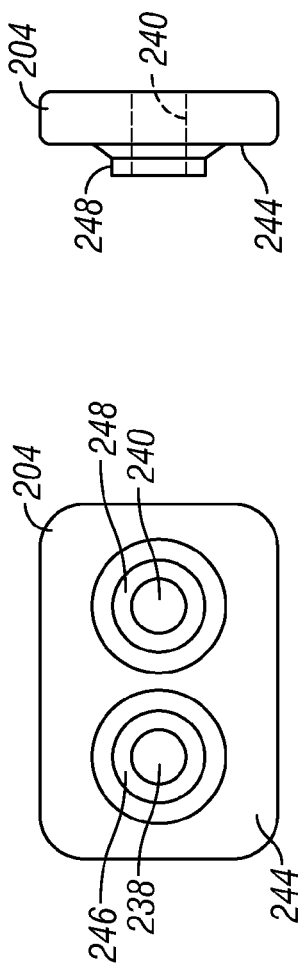
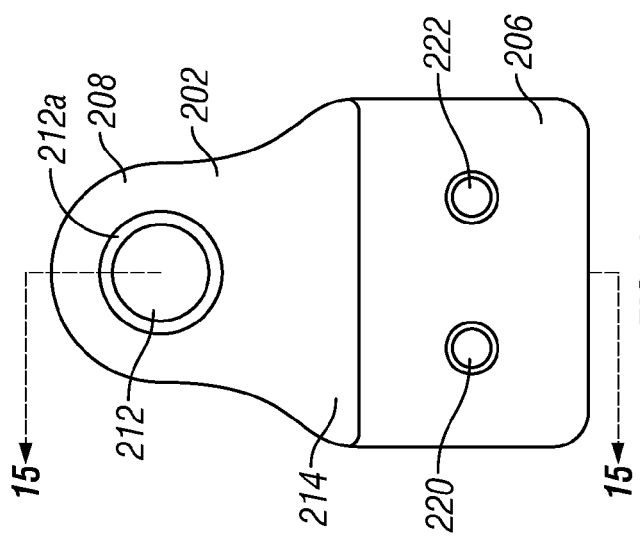

US 8,173,904 B1

POST INSULATOR BLADE ADAPTOR

CROSS-REFERENCE TO RELATED APPLICATION(S)

This application claims the benefit of provisional application Ser. No. 61/171,172, filed Apr. 21, 2009, entitled "Y-Clevis Insulator Clamp," the contents of which are incorporated herein by reference.

FIELD OF THE INVENTION

The present invention relates generally to power transmission lines and more specifically, but without limitation, to assemblies for supporting power lines on post insulator arms.

BRIEF DESCRIPTION OF THE DRAWINGS

FIG. 6 shows a front elevational view of the body of the adapter shown in FIG. 5.

FIG. 7 is a sectional view taken along line 7-7 in FIG. 6.

FIG. 8 is a rear elevational view of the adapter body shown in FIG. 6.

FIG. 9 is a front elevational view of the back of the adapter.

FIG. 10 is a side elevational view of the adapter back shown in FIG. 9.

FIG. 14 shows a front elevational view of the body of the adapter shown in FIG. 13.

FIG. 15 is a sectional view taken along line 15-15 in FIG. 14.

FIG. 16 is a rear elevational view of the adapter body shown in FIG. 13.

FIG. 17 is a front elevational view of the back of the blade adapter shown in FIG. 13.

FIG. 18 is a side elevational view of the adapter back shown in FIG. 17.

DETAILED DESCRIPTION OF THE PREFERRED EMBODIMENT(S)

Above-ground power lines or cables typically are supported well above the earth by means of a series of electrical transmission towers. The conductive cables are supported by transmission insulator assemblies, called line post insulators, which extend laterally from the sides of the towers or posts on which they are mounted. More specifically, the power line is held in a suspension clamp supported by a Y-clevis that attaches to a blade end fitting on the end of the insulator arm.

Figure 1:
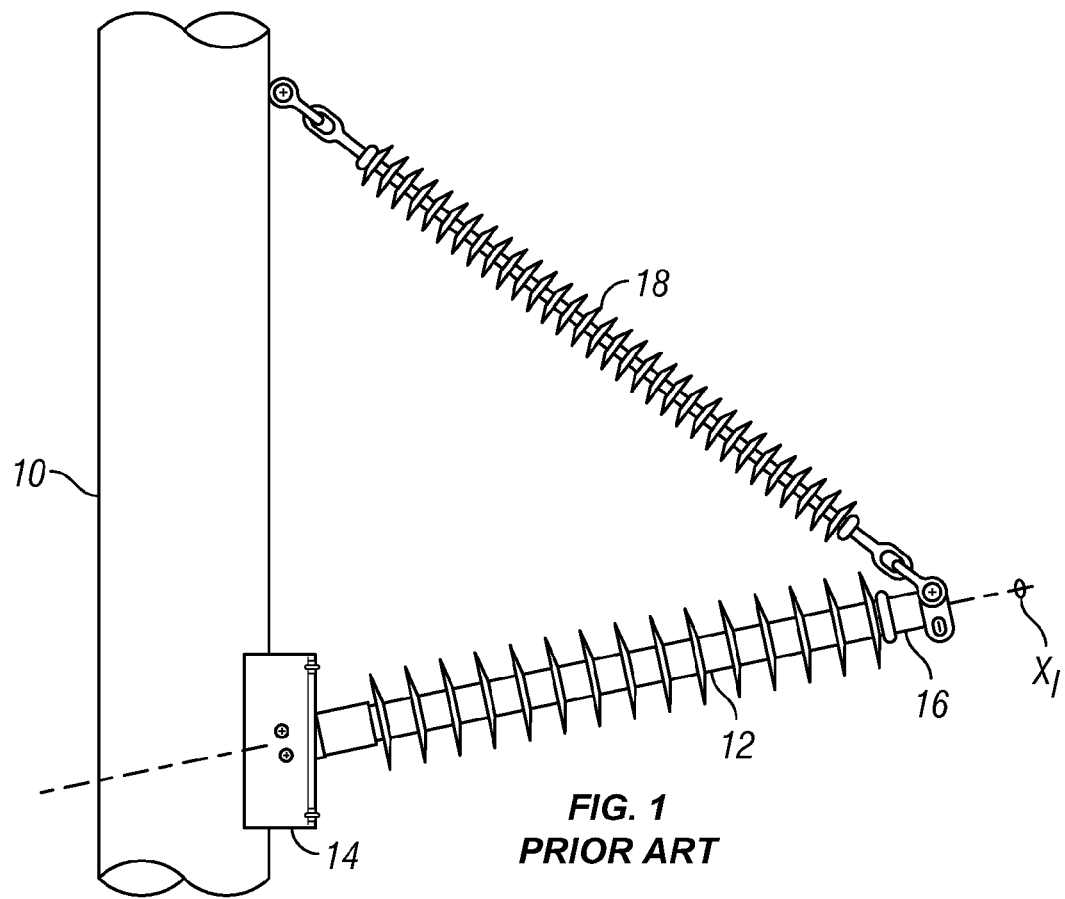
FIG. 1 is a fragmented side elevational view of a transmission tower that is supporting a conventional line post insulator arm with a blade type end fitting. A brace insulator connects to the upper hole of the end fitting.

Shown in FIG. 1 is a side perspective view of a conventional transmission tower 10 supporting a typical line post insulator arm 12. The insulator arm 12 extends generally horizontally from a base fitting 14 mounted on the side of the tower 10. A conventional two-hole or two-eye blade type end fitting 16 is permanently fixed to the end of the insulator arm 12. A brace insulator 18 may be employed to provide additional stabilization for the primary insulator arm 12. The free end of the brace insulator 18 attached to the top hole or eye 20 (FIG. 2) in the blade end fitting 16.

Figure 2:
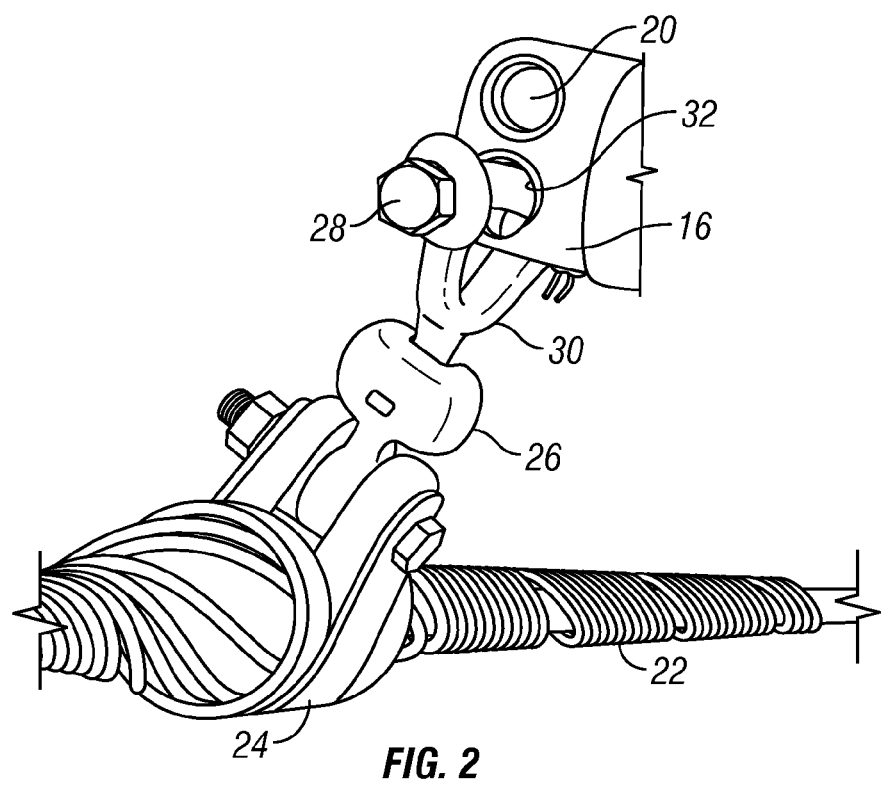
FIG. 2 is an enlarged perspective view of a two-hole blade type end fitting with a Y-clevis attached to the lower hole. The Y-clevis is holding the power line in a suspension clamp.
Figure 3:
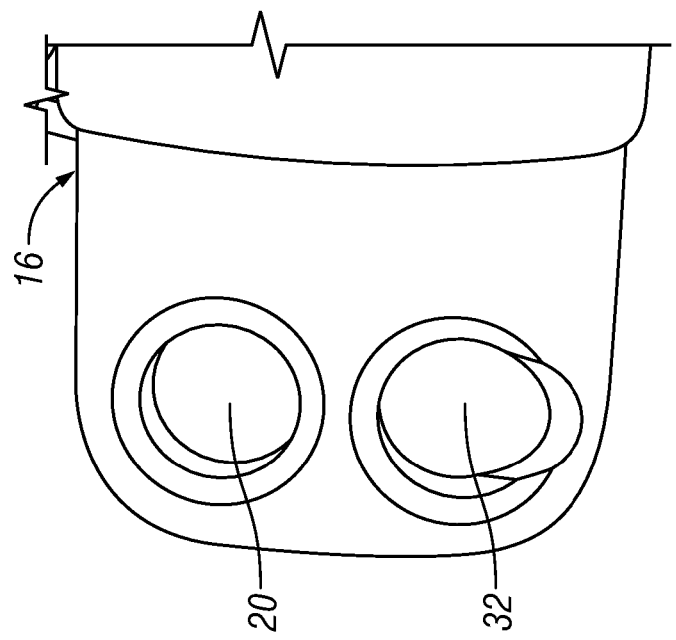
FIG. 3 is an enlarged perspective view of a two-hole blade type end fitting showing the deformation of the lower hole in the end fitting resulting from the wear of the Y-clevis bolt.

FIG. 2 illustrates how the power line 22 is supported on the insulator arm 12. The power line 22 is held in a suspension clamp 24 supported by a Y-clevis 26. The curved bolt 28 in the yoke 30 of the Y-clevis 26 extends through the lower eye 32 of the end fitting 16. The Y-clevis bolt 28 absorbs normal movements of the power line relative to the insulator arm 12 caused by wind and weather. Over time, however, clevis bolt 28, which usually is made of steel, gradually deforms and weakens the eye 32 in the end fitting 16, which usually is made of aluminum, as shown in FIG. 3. This can eventually break the fitting 16, resulting in a dropped power line. Dropped power lines are an electrical hazard and can cause damage to the surrounding structures, in addition to the inconvenience and risks associated with power outages.

Heretofore, the only remedy for a damaged blade end fitting was replacement of the entire insulator arm because the end fitting is permanently fixed to the end of the arm. The present invention provides an adapter that eliminates the need to replace the insulator arm when the end fitting becomes worn. The adapter of the present invention is interposed between the blade end fitting 16 on the insulator arm 12 and the bolt 28 of the Y-clevis 26. The adapter of this invention can be installed easily in a few minutes on existing insulator arms without any power interruption and without dismantling the insulator arm assembly.

The adapter is made of steel and resists wear from the steel bolt 28 of the Y-clevis 26. However, even if the adapter becomes worn or damaged, it is easily replaced. Thus, the retro-fittable, replaceable line post insulator blade end fitting adaptor of the present invention greatly reduces the danger, inconvenience, and expense associated with dropped power lines caused by failed end fittings.

Figure 4:
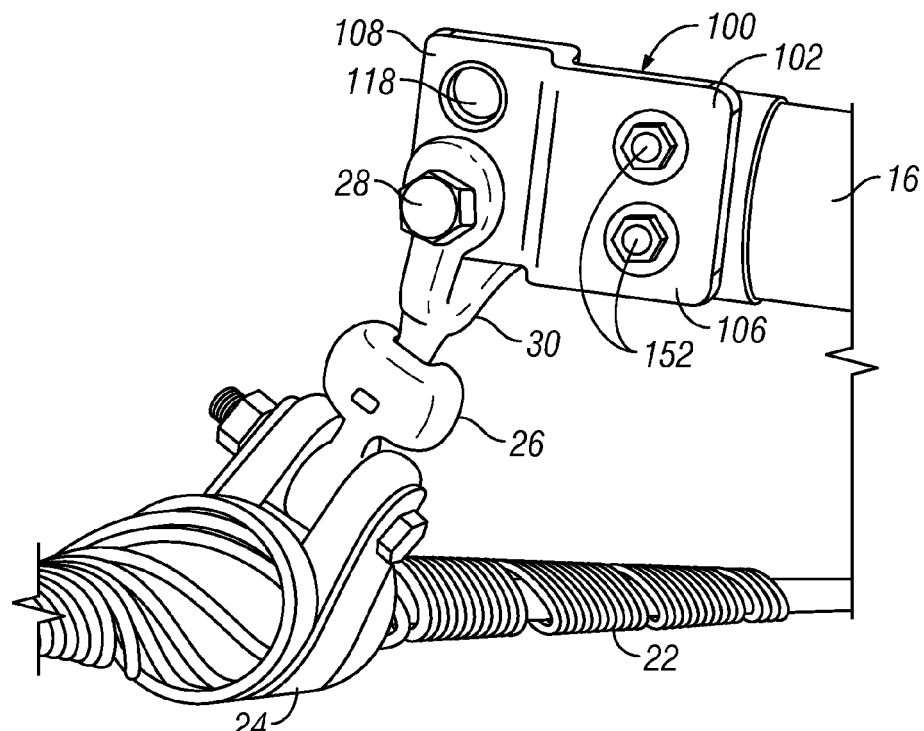
FIG. 4 shows an insulator blade adapter made in accordance with a first preferred embodiment of the present invention. The adapter is shown installed between a two-hole blade type end fitting of a line post insulator arm and a Y-clevis.

Turning now to the drawings in general and to FIG. 4 in particular, there is shown therein an adapter for a line post insulator arm blade end fitting constructed in accordance with a first preferred embodiment of the present invention and designated generally by the reference number 100. The adaptor 100 is shown installed between the two-hole blade end fitting 16 of a braced post insulator arm 16 (FIG. 1) and the Y-clevis bolt 26.

Figure 5:
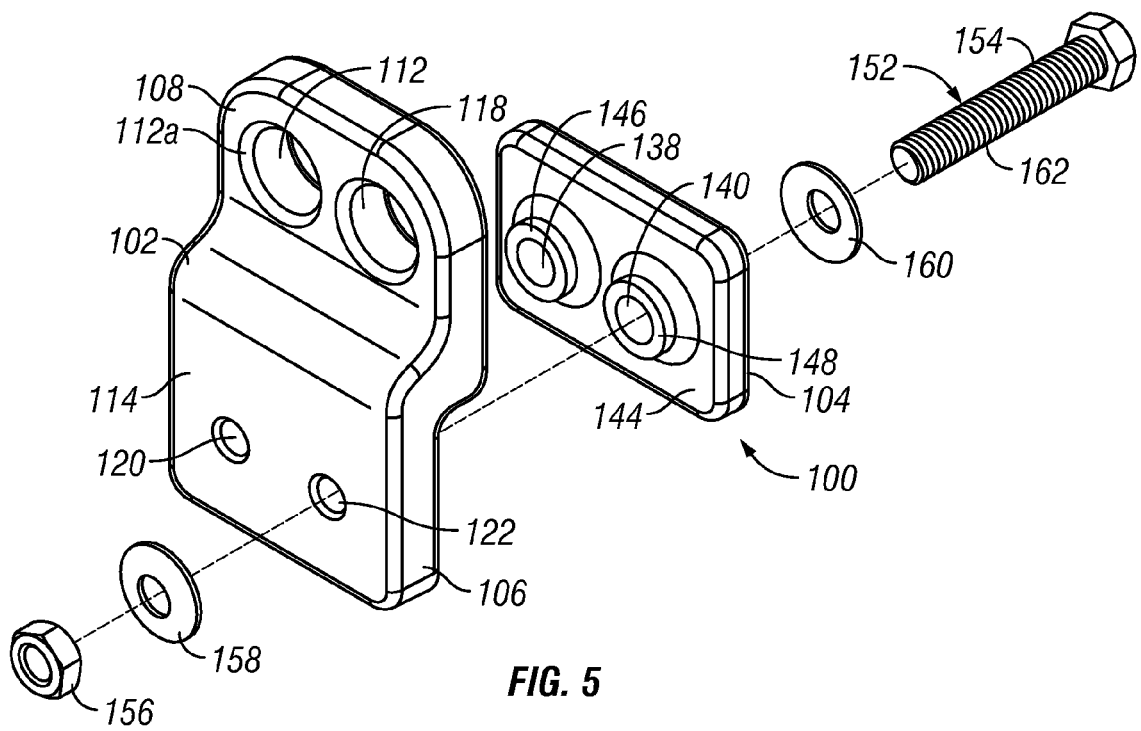
FIG. 5 is exploded, perspective view of the post insulator blade adapter shown in FIG. 4. Only one connector bolt is shown to simplify the illustration.
Figure 12:
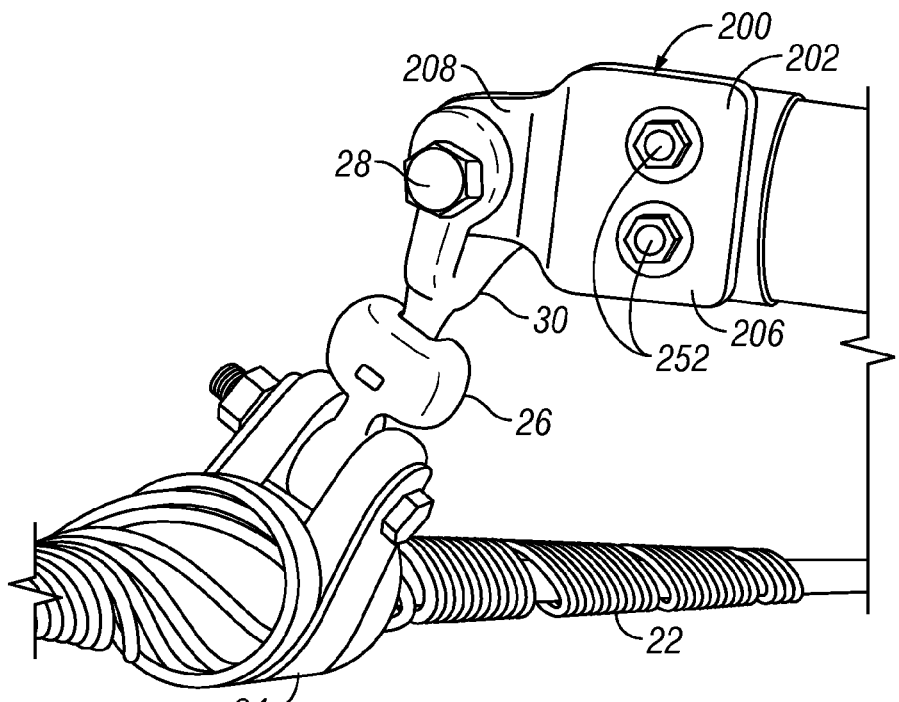
FIG. 12 shows an insulator blade adapter made in accordance with a second preferred embodiment of the present invention. The adapter is shown installed between a two-hole blade type end fitting of a line post insulator arm and a Y-clevis.
Figure 13:
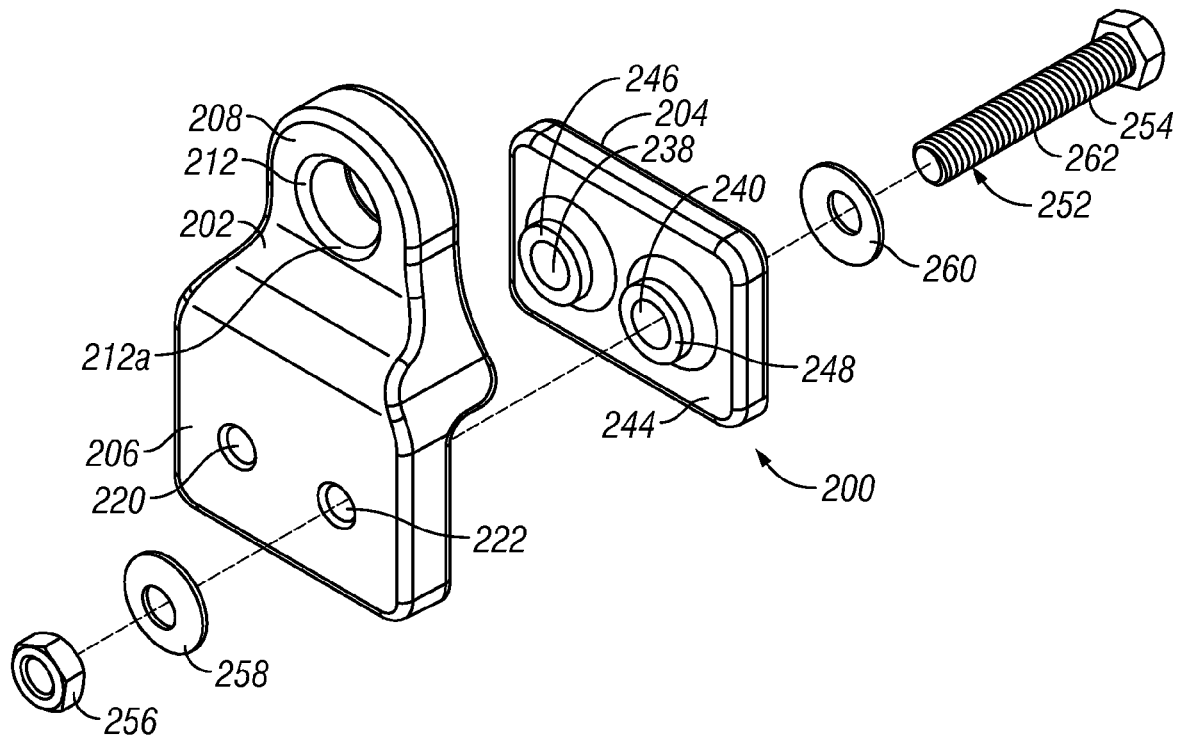
FIG. 13 is exploded, perspective view of the adapter shown in FIG. 12. Only one bolt is shown to simplify the illustration.

With reference now also to FIGS. 6-10, the preferred structure for the adapter 100 will be described. As best seen in FIG. 5, the adapter 100 preferably comprises an adapter body 102 and a back 104. The adapter body has an insulator end 106 and a conductor end 108. The conductor end 108 is attachable to the Y-clevis 26 that supports the power line 22 (FIG. 4), and the insulator end 106 attaches to the blade end fitting 16 of the insulator arm 12 (FIG. 1).

The conductor end 108 of the body 102 has a first eye 112 for receiving the Y-clevis bolt 28 in the same manner as the lower eye 32 in blade end fitting 16. The rims 112a and 112b of the first eye 112 on front face 114 and rear face 116 of the conductor end 108 of the adapter body 102 are chamfered to accommodate the curved shaft of the Y-clevis bolt 26.

In this embodiment, the conductor end 108 also has a second, upper eye 118 to serve as an attachment point for the end fitting of a brace insulator 18, as shown in FIG. 1. The second eye 118 is positioned to be above the first eye 112 when the adapter 100 is installed between the insulator arm 12 and the Y-clevis 26.

Referring still to FIGS. 5-10, the insulator end 106 has two holes 120 and 122 sized and positioned to align with the holes 20 and 32 (FIGS. 2 & 3) in the blade end fitting 16. Preferably, the holes 120 and 122 have internal threads, shown at 128 in FIGS. 7 and 11, to receive bolts described below. Additionally, rear face 130 of the insulator end 106 of the adapter 100 is provided with annular shoulders 132 and 134 around each of the holes 120 and 122 for a purpose that will become apparent.

The adapter back 104, best seen in FIGS. 5, 9 and 10, also is provided with two holes 138 and 140 configured to align with the holes 120 and 122 in the insulator end 106 of the adapter body 102. The front surface 144 of the back 104 also preferably is provided with annular shoulders 146 and 148 around the holes 138 and 140.

Figure 11:
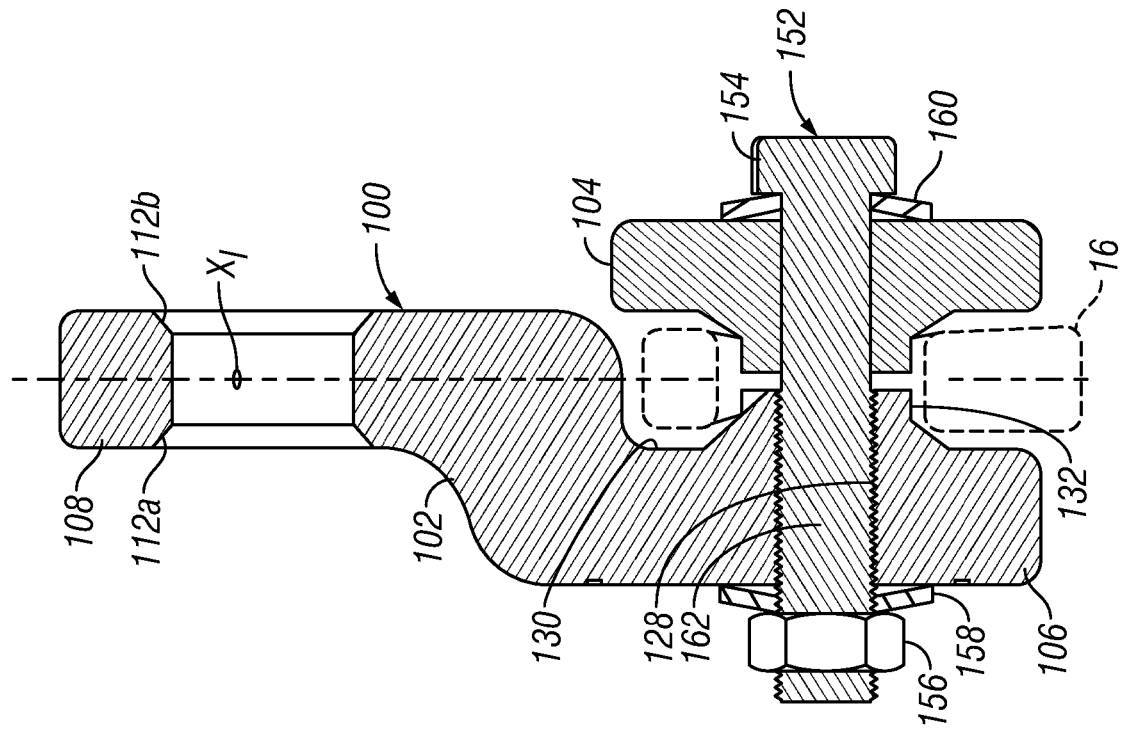
FIG. 11 is a sectional view through an assembled adapter. The blade end of the insulator arm end fitting is shown in phantom lines.

Now it will be understood that the insulator end 106 of the adapter body 102 and the adapter back 104 are sized and shaped to form a clamp that fits over the blade end fitting 16 of the insulator arm 12, as best seen in FIG. 11. Similarly, the holes 120 and 122 in the body 102 and the holes 138 and 140 in the back 104 are sized and positioned to oppose each other on opposite sides of the end fitting 16 and to align with the holes 20 and 32 therein. That is, the end fitting 16 is sandwiched between the back 104 and the insulator end 106 of the adapter body 102.

The adapter 100 comprises a connector assembly for interconnecting the assembled adapter with the end fitting 16. For this purpose, two bolt assemblies are ideal, though other types of connectors may be employed. A preferred bolt assembly, only one of which is shown in the drawings and designated generally by the number 152, comprises bolt 154, a nut 156, and two washers 158 and 160, which all preferably are formed of stainless steel. Preferably, the bolt 154 is a hex-head bolt with a threaded shaft 162 that is threaded engagable with the threads 128 in the holes 120 and 122 in the insulator end 106 of the adapter body 100. The washers may be Belleville type washers.

Because the holes 120 and 122 in the adapter body 102 are threaded for the bolt 152 and the holes 138 and 140 of the back 104 are smooth (not threaded), the installation is simplified. The installer aligns the adapter body 102 and back 104, inserts the bolts 154 and washers 160. By turning the bolt 154, the back 104 and body 102 are drawn together. After the bolt 154 is securely tightened, the washers 158 and nut 156 are assembled and tightened to secure the bolt 154.

It will be apparent now that when the insulator end 106 of the adapter body 102 and the adapter back 104 are connected to the blade end fitting 16, as shown in FIGS. 4 and 11, the shoulders 132 and 134 on the body 102 oppose or face the shoulders 146 and 148 on the back 104. When assembled, the shoulders 132 and 134 on the body 102 and the shoulders 146 and 148 on the back 104 extend a distance inside the holes 20 and 32 of the end fitting 16.

The shoulders 132 and 134 may or may not physically abut or engage the shoulders 146 and 148, but in either instance the opposing shoulders serve to center the bolts 154 and capture the blade end fitting 16 inside the adapter 100. This is accomplished regardless of the degree of deformation (see FIG. 3) that may be present in the eye 32 in the end fitting 16. The nature and extent of the distortion in the end fitting 16 caused by the Y-clevis bolt 28 is variable and unpredictable. The opposing shoulders 132 and 146 and 134 and 148 together generally form an internal bore to receive the bolt independent of the shape of the eye 32. Thus, there is no need for filing or shaping the adapter 100 when it is installed to accommodate the unique shape of a deformed hole.

In the typical blade type end fitting, depicted in FIG. 2, the end fitting 16 is aligned with the longitudinal axis or the load axis "$X_1$" of the insulator arm 12. It will also be apparent now that, once installed between the insulator arm 12 and the Y-clevis 26, the adapter 100 becomes a removable extension of the end fitting 16, with the conductor end 108 of the body 102 of the adapter 100 replacing the end fitting 16 as the attachment point for the Y-clevis bolt 28 (and the brace insulator 18 if one is used).

In the most preferred construction of the adapter 100, the adapter is configured so that the conductor end 108 is also aligned with the load axis "$X_1$" of the insulator arm 12, as best seen in FIG. 11. This ensures that the tension load of the power cable 22 is transferred effectively through the adapter 100 into the insulator arm 12. To that end, the body 102 is formed into a "dog leg" shape with the plane of the conductor end 108 offset from the plane of the insulator end 106, as best shown in FIGS. 7 and 11.

Turning now to FIGS. 12-18, a second preferred embodiment will be described. In this embodiment, the adapter, designated generally by the reference number 200 is similar to the adapter 100 previously described and has a body 202 and a back 204. The body 202 has an insulator end 206 and a conductor end 208. The conductor end 208 has an eye 212 with chamfered rims 212a and 212b. The insulator end 206 has holes 220 and 222 with shoulders 232 and 232 on the rear face 230. The back 204 has holes 238 and 240 with shoulders 246 and 248 on the front face 244. Bolt assemblies 252 are also included. In this embodiment, the conductor end 208 of the adapter 200 has only one eye 212 for receiving the Y-clevis bolt 28. This embodiment would be suitable for unbraced applications.

The embodiments shown and described above are exemplary. Many details are often found in the art and, therefore, many such details are neither shown nor described herein. It is not claimed that all of the details, parts, elements, or steps described and shown were invented herein. Even though numerous characteristics and advantages of the present inventions have been described in the drawings and accompanying text, the description is illustrative only. Changes may be made in the details, especially in matters of shape, size, and arrangement of the parts within the principles of the inventions. The description and drawings of the specific embodiments herein do not point out what an infringement of this patent would be, but rather provide an example of how to use and make the invention.

What is claimed is:

1. An adapter for use between a two-hole blade type end fitting on a line post insulator arm and a bolt of a Y-clevis supporting a power transmission cable, the adapter comprising:

an adapter body having an insulator end and a conductor end, the conductor end having a first eye sized to receive the bolt of the Y-clevis, and the insulator end having two holes configured to align with the two holes in the end fitting of the insulator arm;

an adapter back having two holes configured to align with the two holes in the end fitting of the insulator arm and the two holes in the insulator end of the adapter body; and a connector assembly for interconnecting the end fitting of the insulator arm between the insulator end of the adapter body and the adapter back.

2. The adapter of claim 1 wherein the connector assembly comprises a bolt assembly for each of the two holes in the insulator end of the body, each of the bolt assemblies comprising a bolt and a nut.

3. The adapter of claim 2 wherein each of the two holes in the insulator end of the body are threaded to threadedly engage the bolt.

4. The adapter of claim 1 wherein the insulator arm has a load axis and wherein the conductor end is configured to be aligned with the load axis of the insulator arm and with the bolt of the Y-clevis so that the tension load is transferred through the adapter effectively when the adapter is installed between the insulator arm and the Y-clevis.

5. The adapter of claim 4 wherein the insulator end of the body includes an annular shoulder around each of the two holes in the insulator end of the body, and wherein the back of the adapter includes an annular shoulder around each of the two holes in the insulator end of the body, the annular shoulders of the back of the adapter and the insulator end of the adapter sized to extend a distance inside the two holes of the end fitting towards each other.

6. The adapter of claim 1 wherein the adapter body and back of the adapter are formed of steel.

7. The adapter of claim 1 wherein the conductor end of the adapter body further comprises a second eye positioned to be above the first eye of the conductor end of the adapter body when the adapter is installed between the insulator arm and the Y-clevis.

8. The adapter of claim 7 wherein the conductor end is configured to be aligned with the load axis of the insulator arm and with the bolt of the Y-clevis so that the tension load is transferred through the adapter effectively when the adapter is installed between the insulator arm and the Y-clevis.

9. The adapter of claim 8 wherein the insulator end of the body includes an annular shoulder around each of the two holes in the insulator end of the body, and wherein the back of the adapter includes an annular shoulder around each of the two holes in the insulator end of the body, the annular shoulders of the back and the insulator end of the adapter sized to extend a distance inside the two holes of the end fitting towards each other.

10. The adapter of claim 1 wherein the insulator end of the body includes an annular shoulder around each of the holes in the insulator end of the body, and wherein the back of the adapter includes an annular shoulder around each of the two holes in the insulator end of the body, the annular shoulders of the back and the insulator end of the adapter sized to extend a distance inside the two holes of the end fitting towards each other.

11. The adapter of claim 10 wherein the conductor end of the adapter body further comprises a second eye positioned to be above the first eye of the conductor end of the adapter body when the adapter is installed between the insulator arm and the Y-clevis.

* * * * *